June 1, 1937. L. T. PEDEN 2,082,259
COLD-LAY PAVEMENT AND PROCESS OF MAKING THE SAME
Filed May 1, 1933

Inventor
LEO T. PEDEN.
Jesse R. Stone
Lester B. Clark
By
Attorneys.

Patented June 1, 1937

2,082,259

UNITED STATES PATENT OFFICE 2,082,259

COLD-LAY PAVEMENT AND PROCESS OF MAKING THE SAME

Leo T. Peden, Houston, Tex.

Application May 1, 1933, Serial No. 668,788

7 Claims. (Cl. 106—31)

The invention relates to a cold-lay pavement and the process of making up the composite material to be incorporated in the pavement.

There has been considerable development in the laying of pavements of the asphaltic type, wherein the aggregate is laid with a binder so that a permanent and stable pavement may be obtained. The best types of asphaltic pavement have heretofore been obtained by the hot mix method, where the aggregate and binder are heated together and laid while hot. Such process, however, is not available in all locations and the expense of maintaining an organization to heat and lay the hot mix pavement is very great. It is desirable, therefore, to develop a process for making up a composition which can be stored, shipped and laid cold and still approximate the pavement obtained by the hot mix method.

It is one of the objects of the invention to produce a composition for forming pavement which will be made up of segregated particles each composed of a variable number of individual granules or asphalt coated grains of aggregate.

Another object of the invention is to form a bituminous roadway made up of mineral aggregate, each grain of which is coated with bituminous material to form a granule, and wherein a variable number of these granules have adhered together to form a particle which has been coated with a fluxing material in order that the surfaces of the particles will be lubricated and move into interlocking position with the adjacent particles upon the application of pressure at the time the pavement is laid.

Another object of the invention is to develop a process for making a paving composition wherein the mineral aggregate is coated with a more or less stable cementing material to form a composition which may be converted into segregated individual particles of such consistency that they will remain as individual particles during storage or shipping, and from which a stable pavement will be obtained merely by the application of pressure to the material.

Another object of the invention is to obtain a product for use in forming pavements consisting of segregated particles of material, which particles when made up of a variable number of granules will have a lesser superficial area than have the granules which make up such particles.

Another object of the invention is to make up a pavement composition of mineral aggregate and cementitious material which may be fractured in order to form segregated individual particles, such fracture occurring mainly in the cementing material rather than through the mineral aggregate.

A still further object of the invention is to provide a paving composition of segregated independent particles, each particle being made up of a variable number of grains of mineral aggregate, each grain of which is coated with a cementitious material and the particle as a unit may be coated with a fluxing material.

It is also an object of the invention to provide a paving material by treating aggregate with a bitumen so that each grain of aggregate will be coated with the bitumen and when the product is completed ready for storage, shipment, or placing as a pavement, the granules making up the material will be adhering together to form individual particles each made up of a variable number of such adhering granules, which particles may or may not be given a coating of fluxing material.

One of the principal objects of the invention is to provide a road surfacing composition of the bituminous cement type which is readily workable yet adapted for storage or transportation and which may be laid cold and set at atmospheric temperature by the application of pressure.

Still another object of the invention is to produce a road surfacing composition which may be readily applied and spread in thin layers and though having a high percentage of bituminous material it may be laid cold without checking or crumbling.

It is also an object of the invention to provide a composition for paving wherein the mineral aggregate is coated with cementitious material in such a manner that a variable number of these coated grains will adhere together to make up an individual particle and wherein each particle may be then coated with a fluxing material so that a bond will be obtained when the particles are compressed at the time the pavement is laid.

Other and further objects of the invention will be readily apparent when the following description is considered in connection with the accompanying drawing wherein.

Figure 1:
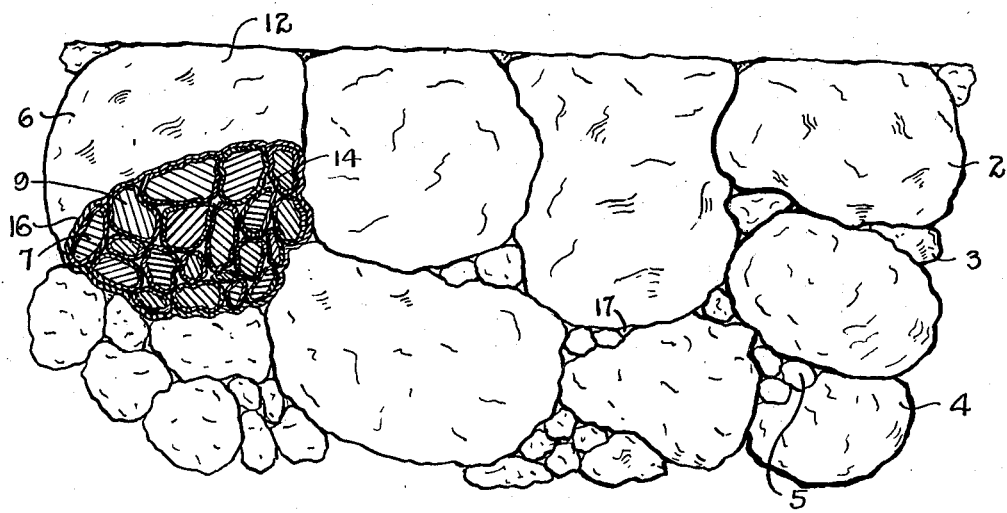
Fig. 1 is a diagrammatic view, certain parts of which are shown in section, illustrating a magnified arrangement of particles to which a flux coating has been applied prior to being laid.

The product of the present invention lends itself very well to conditions wherein a central plant may be economically maintained and operated practically continuously with a view of supplying the paving material to contractors working at more or less widely separated locations to be laid by such contractors by the mere application of pressure.

The invention contemplates the coating of mineral aggregate with a stable bitumen such that when the bitumen becomes fixed, the coated grains will be adhered together by the bitumen in an uncompressed mass, which when subjected to agitation or disintegration will result in a breaking up of the mass in such a manner that the fractures will occur mainly through the bitumen and result in individual particles made up of practically completely coated grains adhering together in variable numbers. These particles may then be coated with a flux or not dependent upon the conditions of manufacture and use.

In practicing the present invention the mineral aggregate will be coated with a stable cement or bitumen so that each grain of aggregate is completely coated to form what will be hereinafter termed a "granule". During the process of applying the bitumen, which may be applied either cold in the form of an emulsion, or in liquid form while hot, each grain is coated to form a granule and a variable number of these granules adhere together to form what will be hereinafter termed a "particle". Each of these particles may be made up of a variable number of granules adhering together.

It is intended that the granules will associate themselves together while the bitumen is in adhesive state at the time the granules are being formed and while their association may be described as uncompressed they will be quite closely arranged and when the bitumen sets or becomes stable the particles will substantially approach the size which it will have in the finished pavement after they have contoured themselves together under the pressure applied in positioning the pavement.

It is to be understood that the mineral aggregate may be coated with the bitumen, cement or binder, in any desired manner such as by tumbling it in an ordinary type of concrete mixer or by treatment in specially constructed equipment. In either instance, the aggregate is coated by the cementing material in any desired manner, such as by immersion in the material or spraying of the cementing material over the aggregate while it is being agitated.

As soon as the aggregate has been completely coated the coating material will be permitted to set or become stable to cause the granules to adhere together and form either an uncompressed mass to be disintegrated or to otherwise form the particles. If the mass is formed it is then subjected to further agitation or in some other manner there will be caused a fracture of the cementing material along the lines of contact between adjacent granules. The cementitious material used is of such consistency that when fracture is caused the fracture will be most liable to occur through the cementing material instead of through the mineral aggregate. The cementing material preferably is of such a stable form that after the coating process has been performed and the individual particles formed, that the composition will present individual non-adhesive pieces which may be stored or shipped without having the particles adhere to each other.

In some instances it may be undesirable to allow the mass to set as such and then be disintegrated, and instead the coated aggregate with the bitumen or cementing material still in an unstable form can be subjected to a suitable cooling or evaporating medium in such a manner that the particles will be formed individually of a variable number of granules without resorting to fracturing of the solidified mass. This may be done by spraying cold water into the mixture while continuing the agitation.

Figure 2:
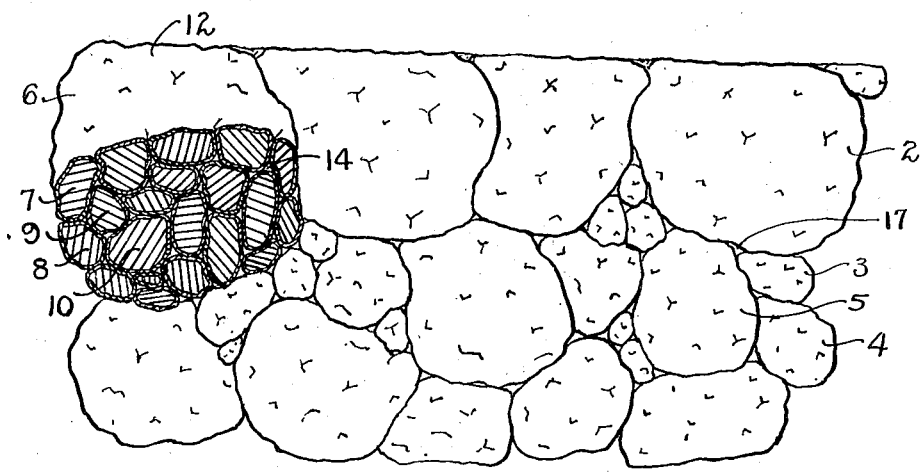
Fig. 2 is a view similar to Fig. 1 but showing the arrangement of unfluxed particles formed into a paving structure.

The particles formed as described will be known as single coated particles because each particle is made up of a plurality of granules having but a single coating. Such particles are best seen in Fig. 2 where the particles are indicated at 2, 3, 4, and 5. As seen in the drawing, these particles are of different size and configuration and may be made up of a variable number of granules. The left hand side of Fig. 2 illustrates the particle 6, which is made up of a plurality of granules. These granules may be designated as external granules such as 7 and 8, and internal granules 9 and 10. It will be readily apparent therefore that the exposed or superficial area 12 of the particle 6 is considerably less than would be the total of the superficial areas of all of the internal and external granules. This lesser superficial area of the particle is of advantage, because of the so much smaller surface in contact with other particles and because the particle is more or less completely formed at the time the mineral aggregate is coated, so that the particle 6 retains its individual identity until pressure has been applied thereto. Of course, when pressure is applied this particle 6 may be transformed by having a slight sliding frictional contact between the individual granules so that the granules will assume the most compact and interlocked position. The particles being capable of deformation before complete compression, tend to contour themselves together, as seen in Fig. 2, to assume a configuration of maximum interlocked stability.

With the present invention, however, it has been found that the compressed particles 6 produce a pavement which is stable and compact, and substantially approximates the pavement laid by the hot mix method. This type of paving is obtained because, in producing the particles conditions approximating the making of a hot mix have been followed as to proportions, it being intended that in the mixture to be used, the amount of stable bitumen will be determined by the "Pat test", keeping in mind that as a small quantity of bitumen will be added in the case of coated particles that best results will be obtained by using the quantity of bitumen indicated by a light or medium stain except where the mixture is to be used for "skin patches" or where it is to be used in conjunction with a coated stone to produce an asphaltic concrete type in which latter two cases a medium to heavy stain may be adopted as a guide. Of course, the mixture must be heated so as to obtain the test stain in the regulation manner.

The "Pat test" is well understood in the art and is a test made with a sample of hot mixed asphaltic paving material passing #10 screen, which is applied to a sheet of paper in order to determine whether it contains the proper percentage of bitumen. The granules making up the particles 6 are completely coated with the more or less stable bitumen or cementing material at the time the particle is formed and when pressure is applied there may be a slight movement between the individual granules so that they will align themselves in the most compact position without rupturing the particle as a whole. It has been found in practice that this movement takes place because of the fact that each and every granule of the particle was not completely conformed to its adjacent granules when the particles were formed. In other words, the particles were not compacted until laid. There have been some slight voids such as 14 shown in between the granules but these voids are not formed by the evaporation of volatile matter, but are caused by the fact that there is only sufficient coating applied to each of the granules to coat that granule, so that there will be practically no excess of coating material. These voids are characteristic of hot mix pavements where care is taken to avoid excess of bitumen. An ideal composition would have no such voids but they have been here shown because such voids are usually present in both hot and cold lay pavements.

It will be understood that any excess of cementing material is injurious because it accumulates between the grains of mineral aggregate and causes them to be spaced apart so that in many instances there is only a point to point contact which causes either crushing of the grains of aggregate or movement of the grains with respect to each other after the pavement has been laid because of the excess of cementing material. It will be understood that when a flux coating is used that such fluxing material can only accumulate in the voids such as 17 between the particles and under no circumstances can such flux enter the voids 14. The voids 17 form a very small percentage of the voids, if any, in the completed pavement.

As previously pointed out, the percentage of bitumen or cementing material to be used and the consistency thereof will vary with climatic conditions, temperatures and localities as well as the nature, size and character of the aggregate used and the period of time the composition is to be stored, the distance it is to be shipped and the conditions under which it is to be laid.

In connection with the form of the invention shown in Fig. 1, the particles may have been formed in the same manner as were the particles 6 described in Fig. 2. In addition, however, each of the completed particles is subjected to a coating or covering over its entire superficial area. This additional coating acts as a fluxing agent and is desirable in some localities and types of pavement, depending upon climatic conditions, the length of time the material is to be stored, the distance it is to be shipped, and the circumstances surrounding its laying in the pavement as well as the type of mineral aggregate used as a base for the composition.

In order to produce the particles as seen in Fig. 1, the particles may be originally formed the same as described in Fig. 2, and, in addition, the complete particles are then coated with a suitable flux indicated at 16. This flux may or may not be a cementitious material which is liquid at atmospheric temperatures and devoid of light volatiles. This coating 16 may be in the form of a lubricant or a solvent so that upon compacting of the particles into the paving structure, there will be less frictional resistance to the proper interlocking or contouring of the particles. It is desirable to avoid introducing any considerable amount of fluxing material or solvent which may evaporate and leave voids in the pavement or if entrapped to remain concentrated in the voids as compression progresses, yet it is often advantageous in obtaining a stable pavement. Therefore, no more fluxing material should be used than absolutely necessary, but rather its quantity minimized and a compensating amount of the bitumen stable at atmospheric temperatures may be used in lieu of a portion thereof and consequently a stable bitumen more nearly approaching what would be used with the given aggregate in standard hot pavements may be utilized. Thus, the standards of established practice in proportioning hot mixtures may be very closely approached with a consequent improvement in quality over other known cold laid pavements.

It has been found that a more stable paving is obtained if each individual grain of aggregate is not double-coated with a stable cementitious base and a more or less unstable outer coating as is practiced in certain methods now used. The present invention is therefore of advantage over the double-coated grains because the individual particles, such as 6, present a much less superficial area to be double-coated than do the individual granules when taken as individual pieces. As a matter of fact, it has been found in the case of Dittlinger limestone screenings, crusher run that only approximately fifteen percent of the superficial area of the granules making up the particles is exposed to be coated with the flux or solvent. It is thus apparent that a very great decrease of fluxing material is required which, in turn, permits the use of an increased amount of stable bitumen resulting in a more stable pavement. The use of a lessened quantity of solvent or fluxing material is of substantial advantage because it is not present to later evaporate and leave voids in the pavement or to accumulate in such manner that it is trapped between the particles to cause flowing of the pavement under heavy traffic.

It is contemplated that the composite paving material herein described may be made up in any desired manner either by coating the mineral aggregate with an asphalt which is solid at atmospheric temperatures and then disintegrating the material by agitation, or by coating the aggregate and causing it to become stable in particle form. Other methods may be practiced as long as the resultant product is segregated into particles composed of a variable number of grains of mineral aggregate each of which is coated and bonded with the adjacent grains by a solid asphalt, and then coating, if desired, the particles thus obtained with a flux which is more or less liquid at ordinary atmospheric temperatures and pressures to insure bonding of the adjacent particles when pressure is applied in laying the pavement.

The asphalt may be applied to the aggregate either in a heated liquid form or as an emulsion. The formation of the granules into particles may be accomplished in any desired manner and may be performed directly following the coating of the grains of aggregate at the time of setting or fixation of the coating. The coated grains may be cooled by water after they are coated so that they will in this manner be caused to ball up or adhere together and form the particles, or a blast of air may be used. It seems obvious that the particles may be formed in any desired manner so long as they are composed as herein described. It is contemplated, however, that where the fluxing coating is applied to the particles that the particles will not be hot at the time the flux is applied, so that there will be as little commingling of the stable bitumen and the flux as possible.

With the present invention, because of the fact that the cementing or first coating of the asphalt on the mineral aggregate may become hard or fixed and the granules stuck together, it is possible to use either heated asphalt for the coating material or to use an emulsified asphalt for this primary coating. The manner of applying this asphalt in either form is so simple that it may be possible to use an ordinary type of concrete mixer not only for the coating of the mineral aggregate with asphalt so that it will become solid at atmospheric temperatures when it sets, but to also use the concrete mixer for disintegrating by agitation, with or without water, the resultant product so that the segregated particles composed of a variable number of pieces of mineral aggregate will be formed. It is also possible to coat the product of this operation, viz, the particles, with the flux or liquid coating, if desired. In other words, the complete operation may be carried out by a batch mix if desired in a concrete mixer, or it may be carried on with a continuous operation as is customary with hot plants. Because of the simplicity of these operations, the cost of production is at a minimum and the composition is therefore very desirable.

When the invention is practiced by coating the aggregate with a liquid asphalt, it is, of course, necessary for this first coating or cementing material to set so that the granules will adhere together to form particles. In this manner the superficial area of each particle is less than the total superficial area of the granules comprising it and when the flux coating, if any is used, is applied much less of the fluxing material is required. If the heating step is used the residual heat in the aggregate must, of course, be dissipated before the flux is applied in order to avoid the immediate fluxing of the stable bitumen and the flux.

Because of the fact that less liquid asphalt, fluxing material or solvent is used per unit of weight of the material, due to the lesser superficial area of the particles, it seems readily apparent that less liquid asphalt will be embodied in the composition. In order to obtain a satisfactory degree of workability, it is possible to use a greater percentage of stable or solid asphalt or cementing material in my composition. This, of course, lends itself to a more stable pavement and is possible because the total amount of asphalt to be applied to a specific type of aggregate under specific working conditions is a fixed quantity well known to those skilled in the art, and approaches as a standard the percentage of asphalt used in the hot mix pavement. This is a very material point, because less fluxing is required at the time the composition is laid. When it is recalled that the fluxing of a liquid with a hard asphalt is a difficult matter, even under ideal conditions, in a central mixing plant or even a refinery, with temperatures running as high as 300° F., it will be apparent that the less fluxing there is required at the time of laying, the more stable will be the pavement. It is, therefore, desirable to depend upon as little fluxing action at the time the composition is laid as possible.

It is also possible with the present invention to entirely avoid the use of quick volatiles and what are known in the art as "cutbacks", because they are slow to effervesce from the composition and they can be entrained between the molecules of heavier petroleum. They, therefore, tend to produce an unstable pavement which is entirely avoided with the present composition.

As a specific illustration of how my invention may be practiced, I will give two illustrations:

(1) Take a mixture having the following composition known as "Richardson's Ideal Sheet Asphalt" as regards aggregate and % A. C.

```
                                                      Percent
Passing  #10 Screen—Retained on  #20 Screen =   3.0
Passing  #20 Screen—Retained on  #30 Screen =   5.0
Passing  #30 Screen—Retained on  #40 Screen =   8.0
Passing  #40 Screen—Retained on  #50 Screen =  11.0
Passing  #50 Screen—Retained on  #80 Screen =  23.5
Passing  #80 Screen—Retained on #100 Screen =  13.0
Passing #100 Screen—Retained on #200 Screen =  13.0
Passing #200 Screen                         =  13.0
Stable asphaltic cement 35 penetration      =   9.5
Liquid flux 50% of 100 penetration asphalt  =   1.0
   Total                                     =100.0
```

Heat mineral aggregate and stable asphalt and mix in pug mixer as is ordinarily customary for the production of hot mix sheet asphalt. Then store mixture uncompressed until hard and disintegrate same by means of a hammer mill or other suitable machinery into segregated particles of about ½″ diameter and less. The material may be laid in this condition or if requirements demand it, a coating of fluxing material liquid at atmospheric temperatures and devoid of light volatiles, may be applied to the particles after which the coated particles may be compressed to form a stable pavement, or (2) As an example of an asphaltic concrete type of mixture about 400# of the fluxed particles previously described may be mixed with about 600# of a graded aggregate retained on #10 screen which has previously been coated with about 3% of a stable asphalt. The coarse stone aggregate may be coated by an emulsified asphalt and the mixture then segregated or the stone may be heated in a drier, allowed to cool to about 100° and then sprayed or mixed either with a standard paving cement or a cutback and the 40% of the sheet asphalt mixture previously described as coated particles added to the coated coarse stone while the latter was still being agitated. By this latter process two such mixtures as "Topeka", "modified Topeka", "Dense Topeka", "coarse graded asphaltic concrete" or "Bitulithic" may easily be produced by skilled persons. Obviously such variations may be made as conditions demand. The use of small quantities of such solvents as naptha on the dry stone will facilitate its coating if the stone be cold.

While the invention has been described as embodying a coating, first, for the individual grains to cause them to adhere to form particles, and then in some instances the coating of these particles with a fluxing material, it is to be understood that the composition may be formed in either way, and that, if desired, the stable coating can be of some material while the flux coating will be of an entirely dissimilar material, depending upon local conditions and other factors which enter into the commercial practicing of the invention.

What is claimed is:

1. A material of manufacture to be laid cold and formed into a pavement by compression, comprising a composite mass made up of a plurality of particles, each particle being composed of a plurality of grains of aggregate cohered together by a cementitious material, and a flux coating covering the particles whereby the particles will be caused to slide relative to each other and move into the most compact position upon compression.

2. A paving construction comprising a plurality of compacted manufactured particles arranged in interengaging relationship to form a stable surface, said particles comprising a variable number of grains of aggregate, each coated with a cementitious material so that said grains are adhered together in a form and of a consistency adapted to be distorted when laid cold under pressure to assume an interfitting shape with adjacent particles, and a non-cementitious flux coating on each particle overlying said cementitious material whereby the frictional resistance between engaging particle surfaces is reduced upon compression by the breaking down thereof so that the cementitious material on adjacent particles will bond together.

3. A method of preparing a paving material consisting of coating grains of mineral aggregate with a cementitious material in liquid form but which is normally stable at atmospheric temperatures and pressures and serves to cause the grains when coated to adhere together, agitating the mass so formed to disintegrate it into individual segregated particles each composed of a variable number of coated adhering grains, and then coating the individual particles with a stable flux adapted to assist in reducing the frictional resistance to movement of the particles when subjected to compression in a pavement.

4. A method of preparing paving material comprising agitating a quantity of mineral aggregate and coating each grain thereof with a bitumen which is stable at atmospheric temperatures so that the bitumen will cause the grains to adhere as a mass, continuing the agitation so that the mass will be disintegrated into individual particles each composed of a variable number of grains loosely adhered together with the bitumen and adapted to be compacted into a paving, and applying a flux coating which is stable at atmospheric temperatures and pressures to the superficial area of the particles so that the particles are capable of storage, shipment, or being laid in a pavement without further treatment.

5. In the art of making paving compositions comprising coating each individual grain of aggregate with a stable cementitious material, fracturing the cementitious material between some of the granules thus formed after it has become stable to obtain particles made up of a variable number of adhering granules, and then coating each particle with a fluxing material to form a product which is stable at atmospheric temperatures and pressures but capable of bonding together due to pressure.

6. In the art of paving the steps of composing a paving material which consist of coating the individual grains of aggregate with a cementitious material stable at atmospheric temperatures and pressures so that the coated grains will adhere together to form particles each made up of a variable number of coated grains when the cementitious material becomes stable, and then coating each particle with a flux of non-cementitious material capable of fluxing with the cementitious coating when subjected to pressure.

7. A paving composition comprised of pieces of aggregate coated with a cementing material and grouped together to form segregated particles which are coated by a fluxing material, said particles comprising a variable number of grains of mineral aggregate coated with a cement stable at atmospheric temperatures and pressures.

LEO T. PEDEN.